(12) United States Patent
Casey-Cholakis et al.

(10) Patent No.: US 6,519,445 B2
(45) Date of Patent: Feb. 11, 2003

(54) METHOD, SYSTEM AND STORAGE MEDIUM FOR PROVIDING TRAINING TO MULTIPLE USERS

(75) Inventors: Evangeline H. Casey-Cholakis, Troy, NY (US); Jeffrey H. May, Dalton, MA (US); Peter Solmssen, West Stockbridge, MA (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/063,970

(22) Filed: May 30, 2002

(65) Prior Publication Data

US 2002/0132215 A1 Sep. 19, 2002

Related U.S. Application Data

(63) Continuation of application No. 09/538,391, filed on Mar. 29, 2000, now Pat. No. 6,438,353.

(51) Int. Cl.[7] .................................................. G09B 5/08
(52) U.S. Cl. ..................... 434/350; 434/322; 434/307 R
(58) Field of Search ................................. 434/118, 322, 434/323, 362, 350, 219, 263

(56) References Cited

U.S. PATENT DOCUMENTS

| 5,310,349 A | * | 5/1994 | Daniels et al. ............... 345/156 |
| 5,311,438 A | | 5/1994 | Sellers et al. |
| 5,372,507 A | | 12/1994 | Goleh |
| 5,395,243 A | | 3/1995 | Lubin et al. |
| 5,437,555 A | | 8/1995 | Ziv-El |
| 5,441,415 A | | 8/1995 | Lee et al. |
| 5,458,494 A | | 10/1995 | Krohn et al. |
| 5,489,213 A | | 2/1996 | Makipaa |
| 5,565,316 A | | 10/1996 | Kershaw et al. |
| 5,727,950 A | | 3/1998 | Cook et al. |
| 5,788,508 A | | 8/1998 | Lee et al. |
| 5,810,605 A | | 9/1998 | Siefert |
| 5,823,781 A | | 10/1998 | Hitchock et al. |
| 5,957,699 A | | 9/1999 | Peterson et al. |
| 6,000,945 A | | 12/1999 | Sanchez-Lazer et al. |
| 6,003,021 A | | 12/1999 | Zadik et al. |
| 6,016,486 A | | 1/2000 | Nichols |
| 6,029,159 A | | 2/2000 | Zorba et al. |
| 6,039,575 A | * | 3/2000 | L'Allier et al. ............. 434/118 |
| 6,052,512 A | | 4/2000 | Peterson et al. |
| 6,057,538 A | | 5/2000 | Zorba et al. |
| 6,067,537 A | | 5/2000 | O'Connor et al. |
| 6,077,085 A | | 6/2000 | Parry et al. |
| 6,091,930 A | | 7/2000 | Mortimer et al. |
| 6,099,320 A | * | 8/2000 | Papadopoulos ............. 345/418 |
| 6,149,438 A | | 11/2000 | Richard et al. |
| 6,149,441 A | * | 11/2000 | Pellegrino et al. .......... 434/118 |
| 6,157,808 A | * | 12/2000 | Hollingsworth ............. 434/219 |
| 6,164,974 A | * | 12/2000 | Carlile et al. ............... 434/118 |
| 6,164,975 A | * | 12/2000 | Weingarden et al. ....... 434/118 |
| 6,190,178 B1 | | 2/2001 | Oh |
| 6,208,832 B1 | | 3/2001 | Remschel |
| 6,438,351 B2 | | 8/2002 | Casey-Cholakis et al. |
| 6,438,353 B1 | * | 8/2002 | Casey-Cholakis et al. .. 434/350 |

FOREIGN PATENT DOCUMENTS

GB          2 321 120 A        7/1998

* cited by examiner

*Primary Examiner*—Joe H. Cheng
*Assistant Examiner*—Kathleen M. Christman

(57) ABSTRACT

An exemplary embodiment of the invention is a method of providing training to a plurality of users in a system including a training system and a plurality of user systems coupled to the training system via a network. The method includes receiving a request to create a training program and providing an editable training program template to the user system in response to the request to edit or create a training program. The editable training program template permits entry of content for the training program. Other embodiments of the invention include a system and storage medium for implementing the method.

30 Claims, 12 Drawing Sheets

FIG. 11

TRAINING STATISTICAL REPORT

GENERAL INTEGRITY AWARENESS TRAINING

GOVERNMENT BUSINESS & FAIR COMPETITION
AVERAGE TIME 6 MINUTES
NUMBER TRAINED: 11
WHERE'S THE LINE?

| | PRETEST | | POSTTEST | |
|---|---|---|---|---|
| | CORRECT-TOTAL | % CORRECT | CORRECT-TOTAL | % CORRECT |
| | 6/11 | 45% | 6/9 | 66% |

WHAT SHOULD BARBARA HAVE DONE DIFFERENTLY IN
PREPARING FOR AND ATTENDING THE FIPA MEETING?

| | | | | |
|---|---|---|---|---|
| SUB TOTAL | 6/11 | 45% | 6/9 | 66% |

METHOD, SYSTEM AND STORAGE MEDIUM FOR PROVIDING TRAINING TO MULTIPLE USERS

CROSS REFERENCE TO RELATED APPLICATIONS

This application is a continuation of U.S. patent application Ser. No. 09/538,391 filed Mar. 29, 2000 now U.S. Pat. No. 6,438,353, the entire contents of which are incorporated herein by reference.

BACKGROUND OF THE INVENTION

The invention relates to a method and system for providing training to multiple users. Computerized training systems exist in the art which present a training program to a user in an effort to train the user in a particular topic. Such systems may present the user with a series of scenarios, questions, etc. and elicit answers from the user. The user's responses are compared to known correct responses and the user is provided with a summary of the number of correct and incorrect answers. Such systems provide rapid feedback to the user and can be useful in identifying areas where the user requires further training.

A drawback to such systems is that often the training program is not easily created or modified by the trainer. Often, the training program which is presented to the user is derived by a training program provider. The training program provider works along with the trainer (e.g., a company desiring to train its workforce in diversity issues) to develop the training program including questions, multiple choice answers, audio, video, etc. If the trainer determines that changes are needed to an existing training program or a new training program needs to be developed, the trainer must contact the training program provider to edit the training program. Such a process results in expense for the trainer and delays in generating training programs.

BRIEF DESCRIPTION OF THE INVENTION

An exemplary embodiment of the invention is a method of providing training to a plurality of users in a system including a training system and a plurality of user systems coupled to the training system via a network. The method includes receiving a request to create a training program and providing an editable training program template to the user system in response to the request to edit or create a training program. The editable training program template permits entry of content for the training program. Other embodiments of the invention include a system and storage medium for implementing the method.

BRIEF DESCRIPTION OF THE DRAWINGS

FIG. 11 depicts an exemplary training statistical report generated by the system of FIG. 1.

DETAILED DESCRIPTION OF THE PREFERRED EMBODIMENT

Figure 1:
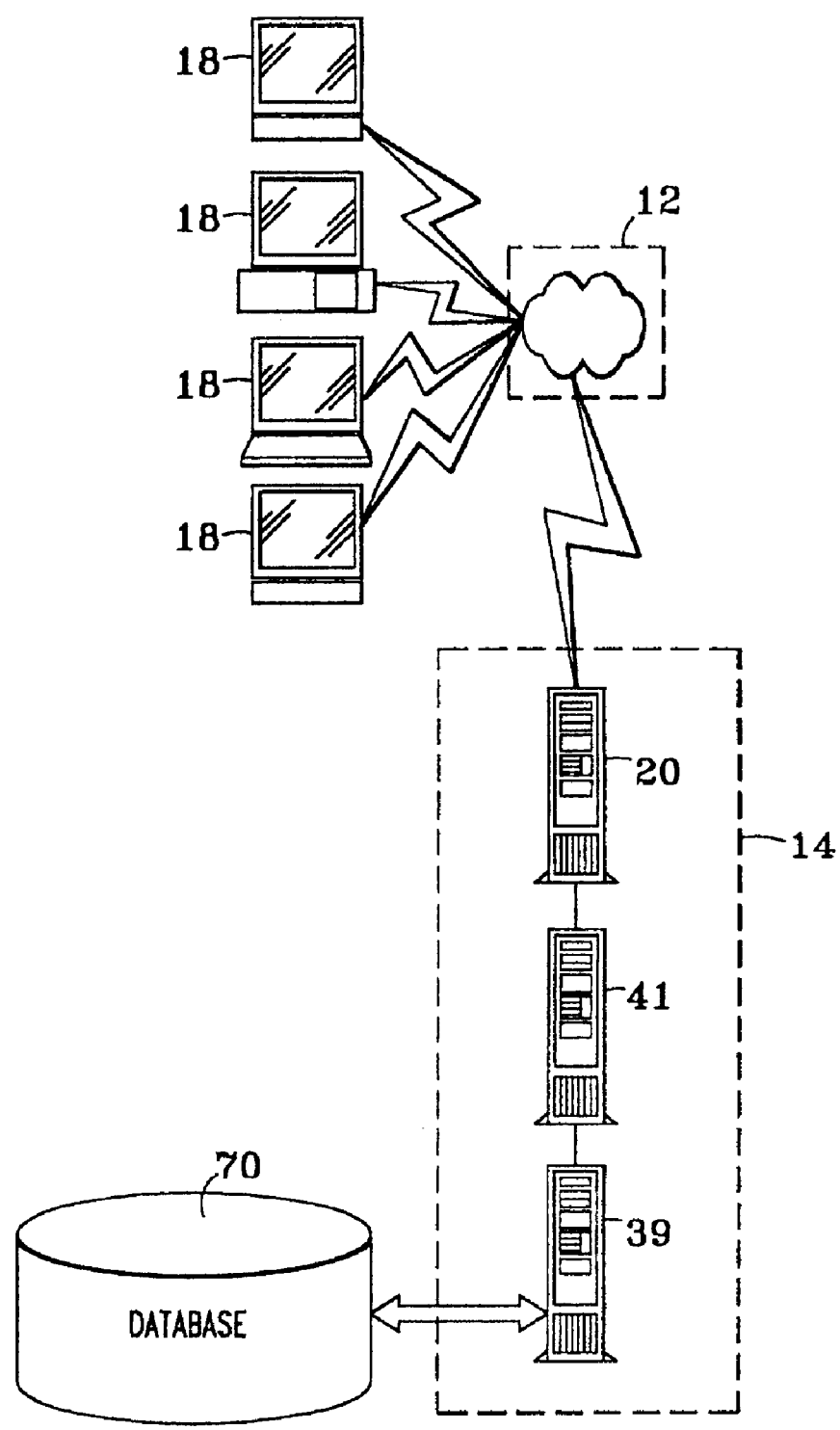
FIG. 1 is a block diagram of a system for providing training in one embodiment of the invention.

FIG. 1 is a block diagram of a system for providing training in one embodiment of the invention. The system includes one or more user systems 18 coupled to a training system 14 via a network 12. Each user system 18 may be implemented using a general-purpose computer executing a computer program for carrying out the processes described herein. The network 12 may be any type of known network including a local area network (LAN), wide area network (WAN), global network (e.g., Internet), intranet, etc. The user systems 18 may be coupled to the training system 14 through multiple networks (e.g., intranet and Internet) so that not all user systems 18 are coupled to the training system 14 via the same network. One or both of the user systems 18 and the training system 14 may be connected to the network 12 in a wireless fashion and network 12 may be a wireless network. In a preferred embodiment, the network 12 is the Internet and each user system 18 executes a user interface application (e.g., web browser) to contact the training system 14 through the Internet 12. Alternatively, a user system 18 may be implemented using a device programmed primarily for accessing network 12 such as WebTV.

The training system 14 includes a network server 20 (often referred to as a web server) to communicate with the user systems 18. The network server 20 may be implemented using commercially available servers as are known in the art. The network server 20 handles sending and receiving information to and from user systems 18 and can perform associated tasks. The training system 14 also includes a firewall 41 to: (1) prevent unauthorized access to the training system 14; and (2) with respect to entities that are authorized access to the training system 14, enforce any limitations on the authorized access. For instance, an administrator may have access to the entire system and have authority to modify portions of the system. By contrast, a trainee contacting the training system 14 from a user system 18 would have the ability to execute training programs but not alter the applications or data stored in database 70. The firewall 41 may be implemented using conventional hardware and/or software as is known in the art.

The training system 14 also includes an applications server 39. Applications server 39 executes one or more computer programs to present the training program to the user systems 18 and perform the processes described herein. It is understood that more than one applications server may be used. Alternatively, the web server, firewall and the applications server can be implemented by a single server executing programs to perform the requisite functions.

The applications server 39 is coupled to a database 70. Database 70 contains a variety of information related to training of users. Such information may include the type of users requiring training, the type of training required by each user and whether each user has completed their requisite training. In an exemplary embodiment, the database 70 includes data similar to that in a human resources database which identifies users by name, employee number, position, etc. In addition, as discussed in further detail herein, database 70 may contain training data accessed by the applications server 39 during presentation of the training program to the user system 18.

Operation of the system will now be described. A number of different users may access the training system including trainees and administrators. In an exemplary embodiment, a trainee is a user who contacts training system 14 in order to obtain training. In an exemplary embodiment, an administrator is a user who may contact the training system 14 to obtain training or may contact the training system 14 to create or modify training programs, specify functions of the system or generate reports regarding training. In an exemplary embodiment, the user system 18 includes a user interface application (e.g., a web browser) which allows the user system 18 to contact the training system 14 via network 12 (e.g., the Internet). The user system 18 may also contact the training system without a direct link to network 12 by using a communications device (e.g., a modem) and the services of an Internet service provider such as the America Online service.

Figure 2:
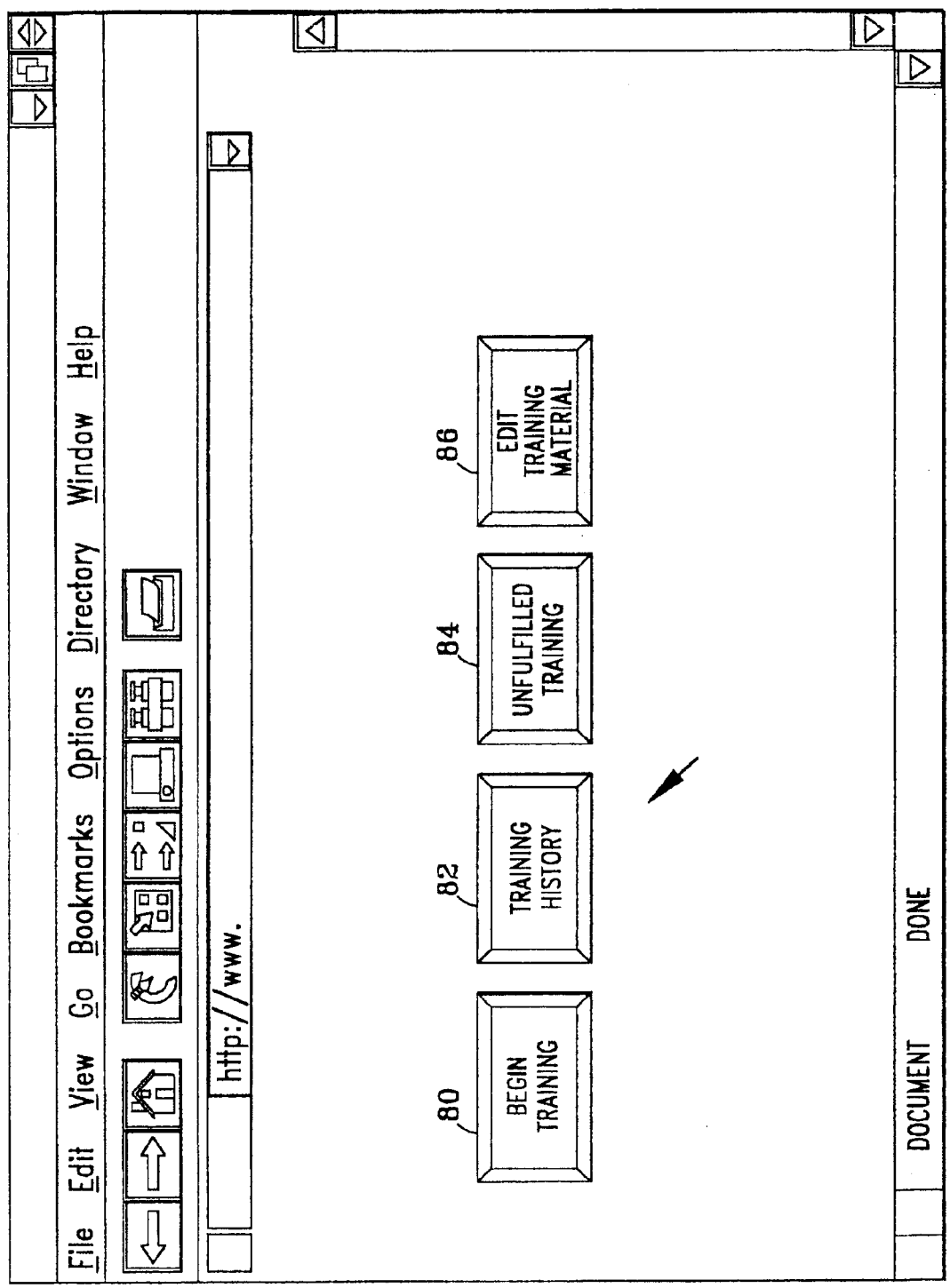
FIG. 2 is an exemplary user interface for initiating training.

Once the user system 18 contacts the training system 14, the training system 14 requires the user to provide a user identity though a log in procedure. This may require entering a user ID and password as known in the art. Once the user has logged in, the training system 14 presents the user system 18 with a main screen such as that shown in FIG. 2. As shown in FIG. 2, the user can begin training by selecting button 80, view training history by selecting button 82, view unfulfilled training by selecting button 84 and edit training material by selecting button 86. The user systems 18 include an input peripheral (e.g., mouse, trackball, keyboard, etc.) that allows the user to select buttons as known in the art. The edit training material button 86 is only presented if the user is an administrator. Administrator operations are discussed herein with reference to FIGS. 4–12.

If the user selects the begin training button 80, the user may first be queried what is the user's preferred language. The training programs can be stored in database 70 in multiple languages. The training programs may also include a language designator which identifies the language of the training program. The user's preferred language is also stored in database 70 in a record corresponding to the user. Subsequent training programs will automatically be presented in the user's preferred language by accessing the training program having the appropriate language designator.

Figure 3:
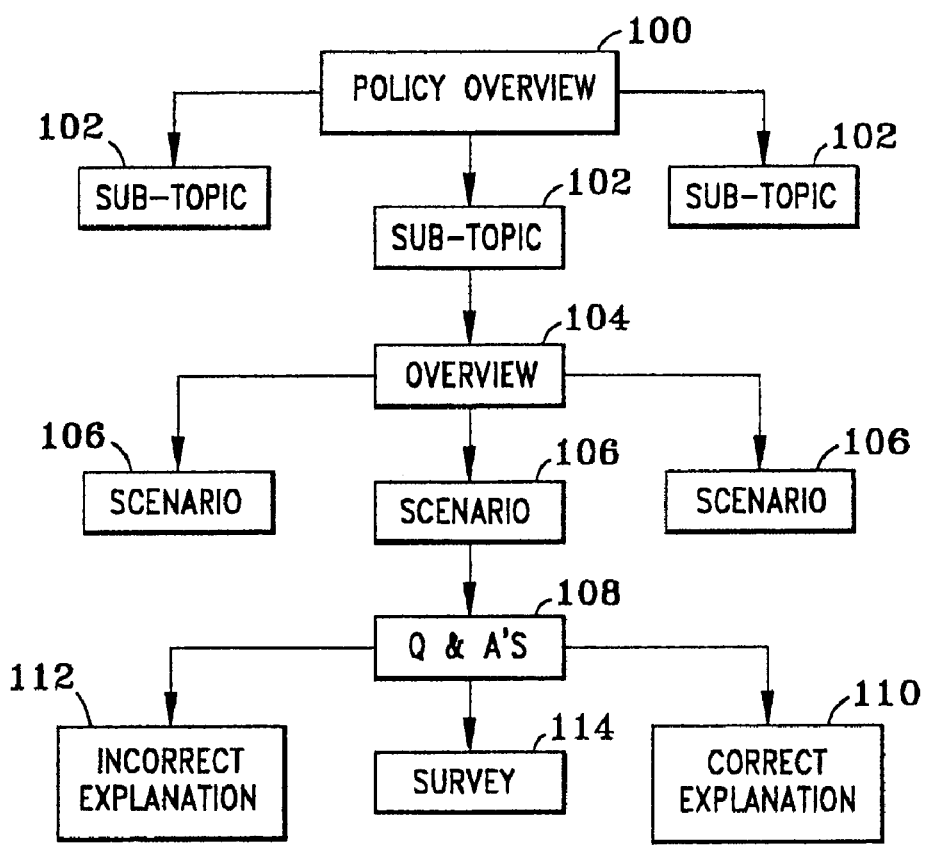
FIG. 3 is a flowchart of a training process in one embodiment of the invention.

The user is then instructed to select a training program which may be performed using a drop down list of available training programs. Since training is typically encouraged, the user is presented with all available training programs. Alternatively, a limited list of available training programs may be presented to the user depending upon user identifiers stored in database 70. The training programs may be organized by policy (e.g., employment issues) with a number of sub-topics under each policy. Upon selecting a training program, the user proceeds through a training program such as that outlined in FIG. 3. As shown in FIG. 3, the user is presented with a policy overview at step 100. For example, if the training program pertains to equal employment opportunity, the policy overview 100 provides a general description of the trainer's equal employment opportunity policy. The user can then select a sub-topic 102 to commence training in that sub-topic. Exemplary sub-topics in the equal employment opportunity training program include non-discrimination, Americans with Disabilities Act, affirmative action, etc. The user selects a sub-topic 102 and is presented with an overview 104. The overview 104 may outline the issues related to the sub-topic and the goals of the training. The user is then presented with one or more scenarios 106 and a series of questions 108 based on each scenario 106. Upon answering a question, the user is presented with a correct answer explanation 110 or an incorrect answer explanation 112 depending on whether the user correctly answered the question. The question and answer process continues until the user has completed the training for all scenarios 106 in the sub-topic 102. The user may then be prompted to complete a survey 114 evaluating the training program with respect to the sub-topic. Another survey may be presented to the user when training for all sub-topics under a policy is completed. The survey allows the user to rate the training program based on a number of factors such as content, relevance, etc. It is understood that the training program may be organized in a variety of fashions and the policy/sub-topic organization is exemplary.

As training of a sub-topic is completed, data concerning the training session is stored in database 70. Such data includes the identification of the sub-topic, an identification of the trainee, the time spent in the training program, and the number of correct answers. This data can be sorted by the training system 14 to generate reports such as those described herein with reference to FIGS. 10–12.

Referring to FIG. 2, the user may select training history button 82 to view a listing of the training that the user has completed. As noted above, when a user completes training for a sub-topic, an identifier of the sub-topic completed and the completion date are stored in that user's record in database 70. Selecting the training history button 82 retrieves this information from database 70 for presentation to the user.

If the user selects the unfulfilled training button 84, the user is presented with a listing of training programs that are to be completed by the user. The listing may include a training program description and a due date for completion. Such information may be generated by the training system 14 and stored in the database 70. As described herein, when a training program is generated, an administrator designates the individuals who must complete the training based on one or more user identifiers. Users meeting the user identifiers are notified that they must complete the training program. For example, all management level employees may require training on proper hiring practices. The training system 14 may execute a training management software application that tracks what training is required for each user and what training has been completed by each user. The training management application sends automated e-mails to users when training is required and automatically updates the user's training history and unfulfilled training as the user completes training. The training management application may be implemented using software such as that available from Saba Software, Inc. When a training program is created or modified, all users required to take such training are automatically notified.

Referring to FIG. 2, if an administrator contacts the training system 14, the administrator is presented with the edit training material button 86. As described above, an administrator is an individual who has authority to create training programs. This authority is granted by one or more managers of the training system. An administrator can create new training programs or can edit training programs they have created. In addition, an administrator may assign authority to edit program materials to others as described herein.

Figure 4:
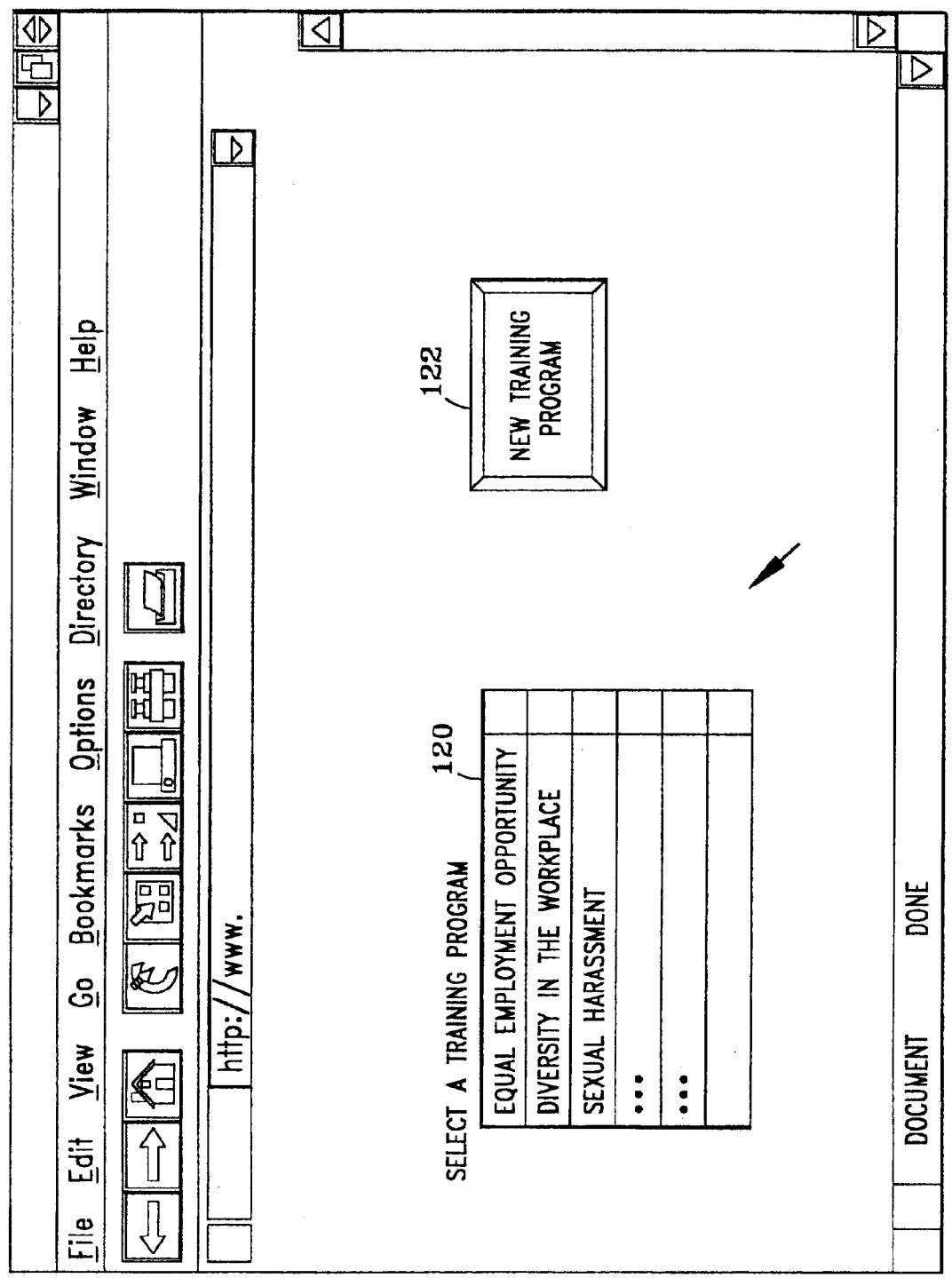
FIG. 4 is an exemplary user interface for editing or creating a training program.

If the administrator selects the edit training material button 86, the administrator is presented with a create/edit screen such as that shown in FIG. 4. As show in FIG. 4, the administrator is presented with a drop down list 120 of training materials that the administrator has authority to edit. These may be training programs created by the administrator or training programs for which the administrator has been assigned the authority to edit. The administrator is also presented with a new training program button 122. Selection of the new training program button 122 allows the administrator to define a new training program.

To edit an existing training program, the administrator selects a training program from the list 120. To create a new training program, the administrator selects the new training program button 122. The processes of editing an existing training program and creating a new training program are similar. The process of editing a training program is shown in FIGS. 5–8.

Figure 5:
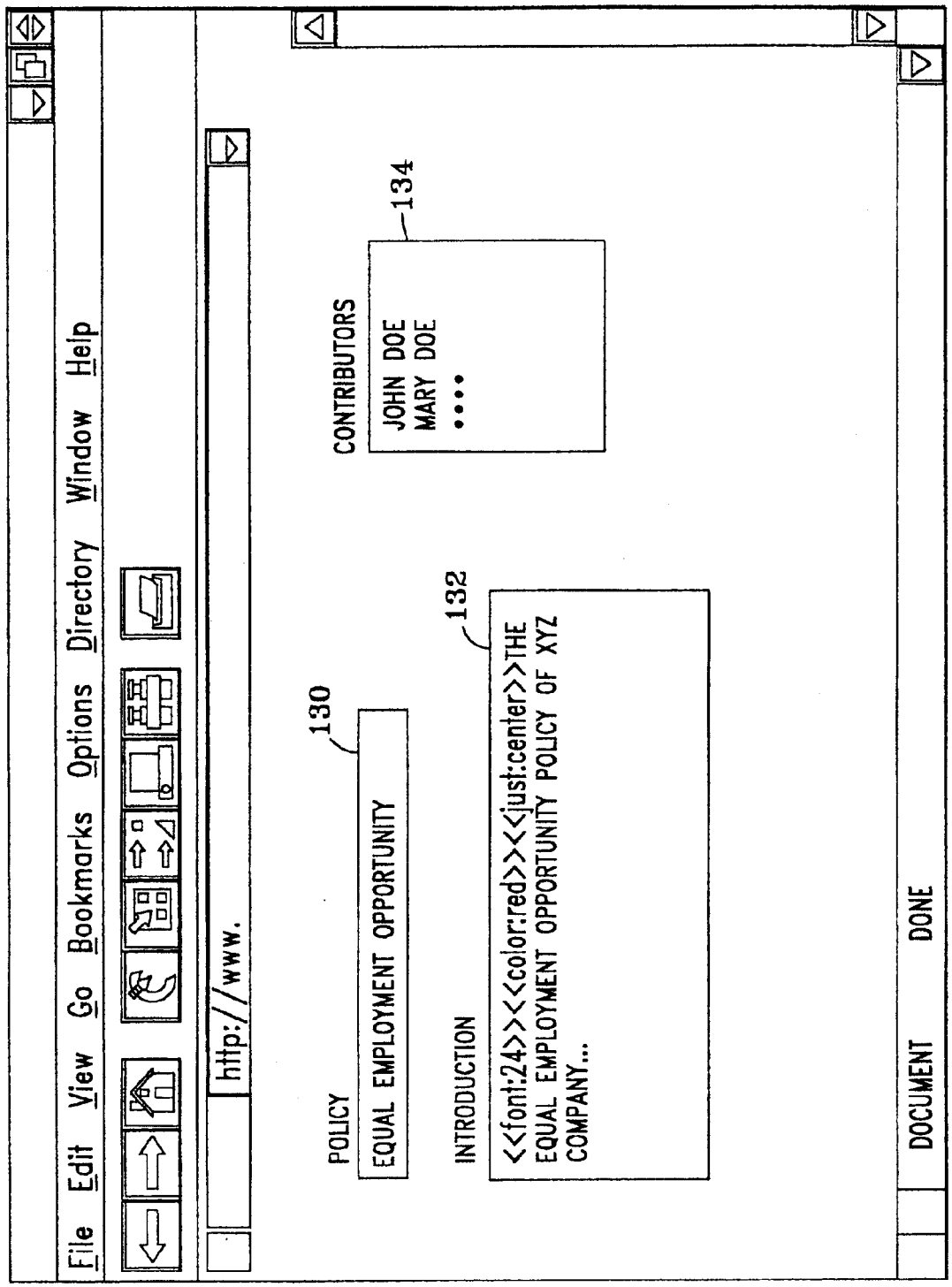
FIG. 5 is an exemplary user interface for editing a training program.

Once the administrator has selected a program for editing from the list 120 in FIG. 4, the administrator is presented with an editable training program template such as that shown in FIG. 5. As shown in FIG. 5, the editable training program template includes dialog windows through which the administrator can edit the content of the training program. As shown in FIG. 5, a policy dialog window 130 allows the administrator to enter the policy name of the training program. FIG. 5 also depicts an introduction dialog window 132 in which the administrator can enter an introduction to the training program. The dialog windows may also contain control codes which adjust appearance and/or position of the text such as font, size, color, justification, etc. The entries into dialog windows can be saved (e.g., in database 70) in text format so that no programming knowledge is needed to create or edit the training program. The content of the training program is not limited to text. The administrator can also specify audio, video, images, graphics, etc. for inclusion in the training program. Such content is inserted in the training program by specifying a file which may be stored in database 70.

Also shown in FIG. 5 is a contributor window 134. The contributor window allows the administrator to assign authority to one or more individuals to edit the training program. When an individual listed in the contributor window 134 accesses the system, the contributor will be given the authority to edit the training program. Contributors may be granted authority to edit the entire training program or only sub-topics within the training program. The administrator may also specify an owner for the training program. An owner is typically a business person who is associated with the training program (e.g., a human resources executive may be considered the owner of a training program on proper hiring practices). The owners may be linked to geographic areas and are identified to aid users in resolving issues regarding the training program. Questions regarding training can be directed to the appropriate owners.

Figure 6:
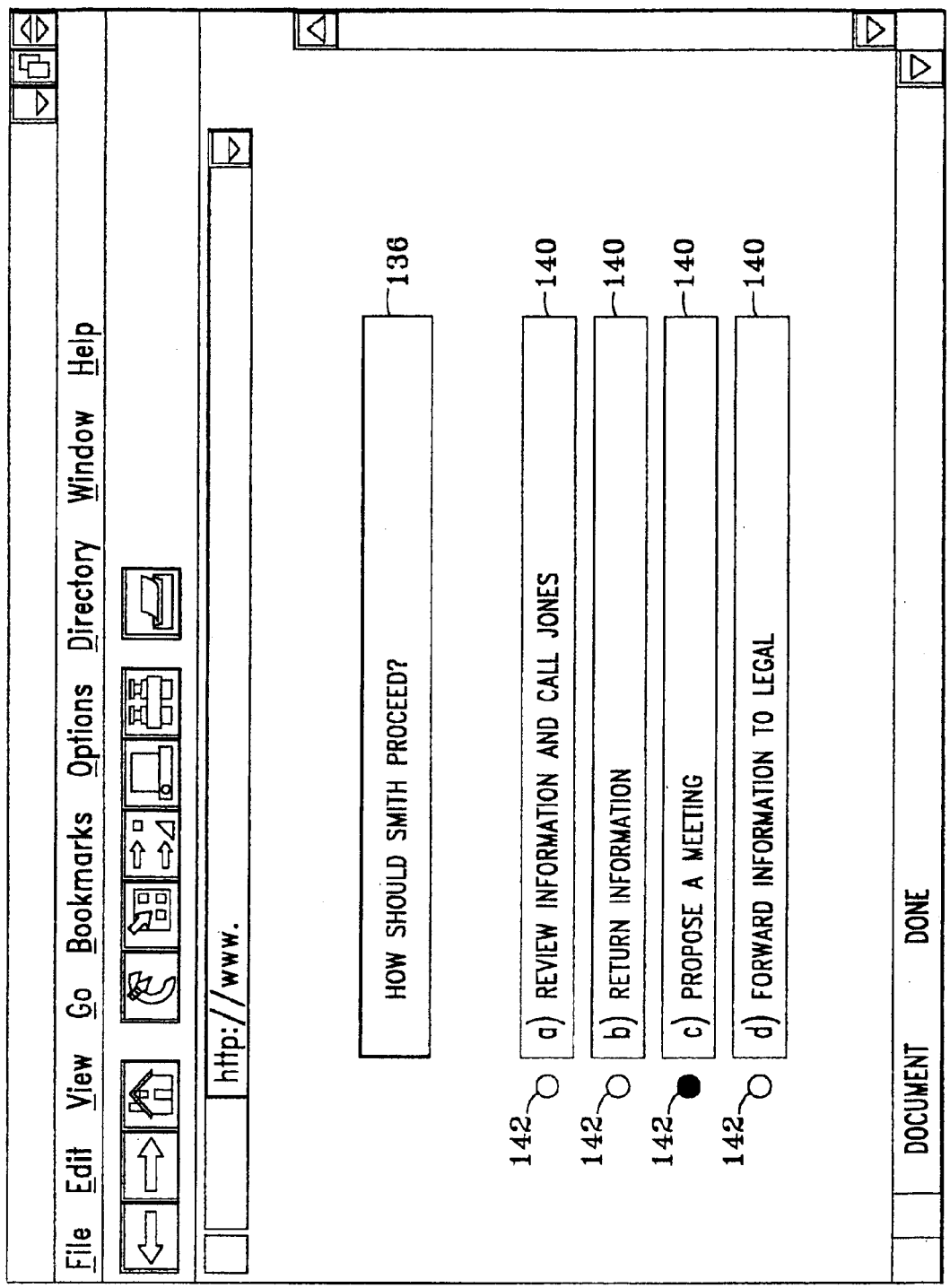
FIG. 6 is an exemplary user interface for editing a training program.

The administrator may also edit questions presented to users through a question window 136 and enter answers through answer windows 140 as shown in FIG. 6. The correct answer is specified by the administrator by selecting an answer indicator 142. As described above, the administrator may easily edit or create questions and answers through the windows provided in the editable training program template. The editable training program template also allows an administrator to provide an explanation for correct answers and incorrect answers through dialog windows such as those shown in FIGS. 5 and 6. The entries into question and answer dialog windows can be saved (e.g., in database 70) in text format so that no programming knowledge is needed to create or edit the training program.

Figure 7:
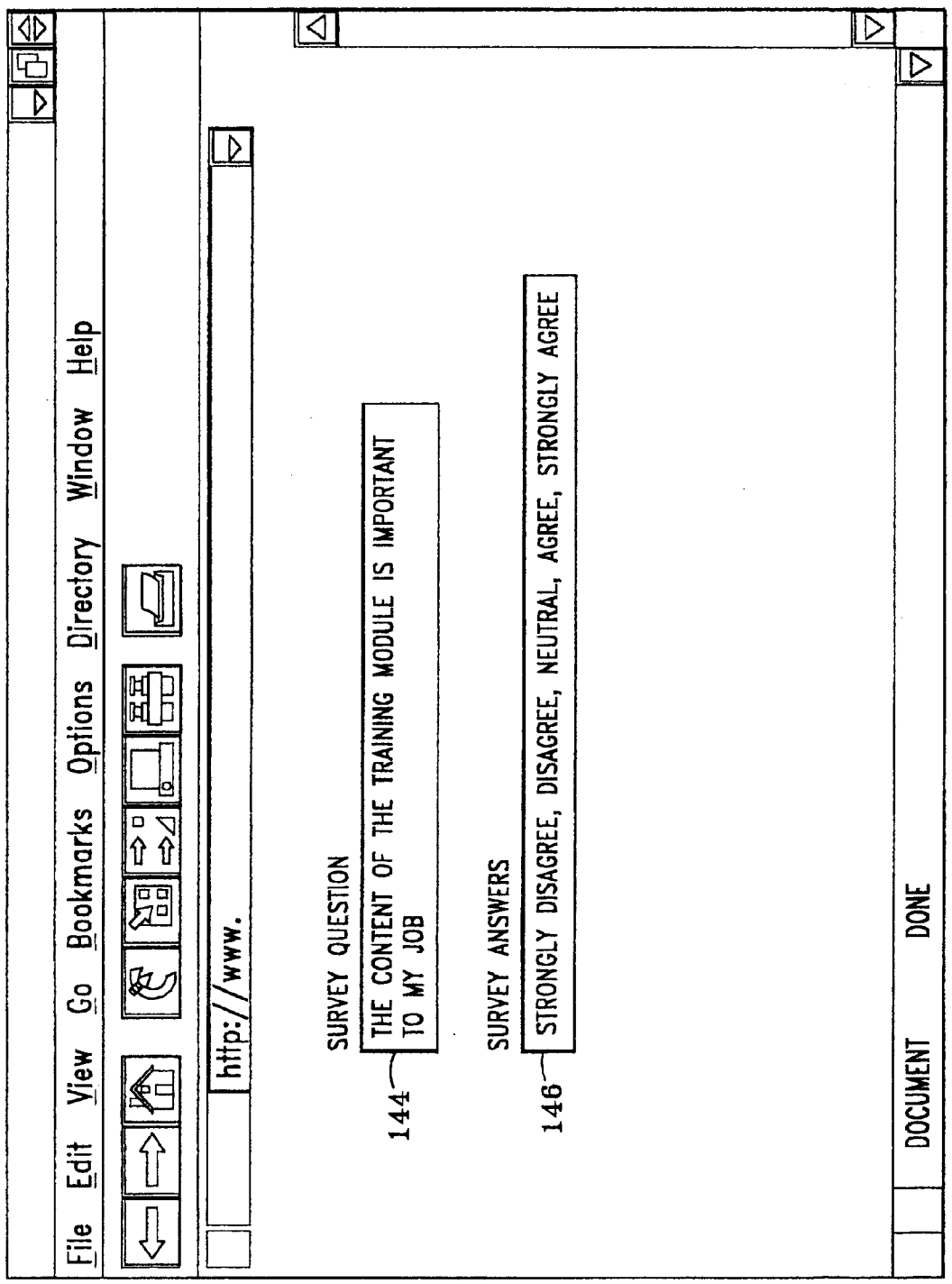
FIG. 7 is an exemplary user interface for editing a training program.

As shown in FIG. 3, the user may also complete a survey. The contents of the survey may be edited or created by an administrator through the editable training program template. FIG. 7 illustrates an exemplary portion of the editable training program template directed to a survey. The administrator can edit questions through a survey question window 144 and specify responses in a survey response window 146. Again, the editable training program template allows editing of the survey content through simple text editing. The entries into survey dialog windows can be saved (e.g., in database 70) in text format so that no programming knowledge is needed to create or edit the training program. As noted above, the process for creating a training program is similar to that of editing a training program except that the administrator will be entering content in the editable training program template for the first time.

In addition to providing for simple creation and editing of individual training programs, the training system provides for editing of introductory material to the training system. Certain individuals may have system wide access and are referred to as system administrators. The system administrators can perform a number of tasks described with reference to FIGS. 8–12.

Figure 8:
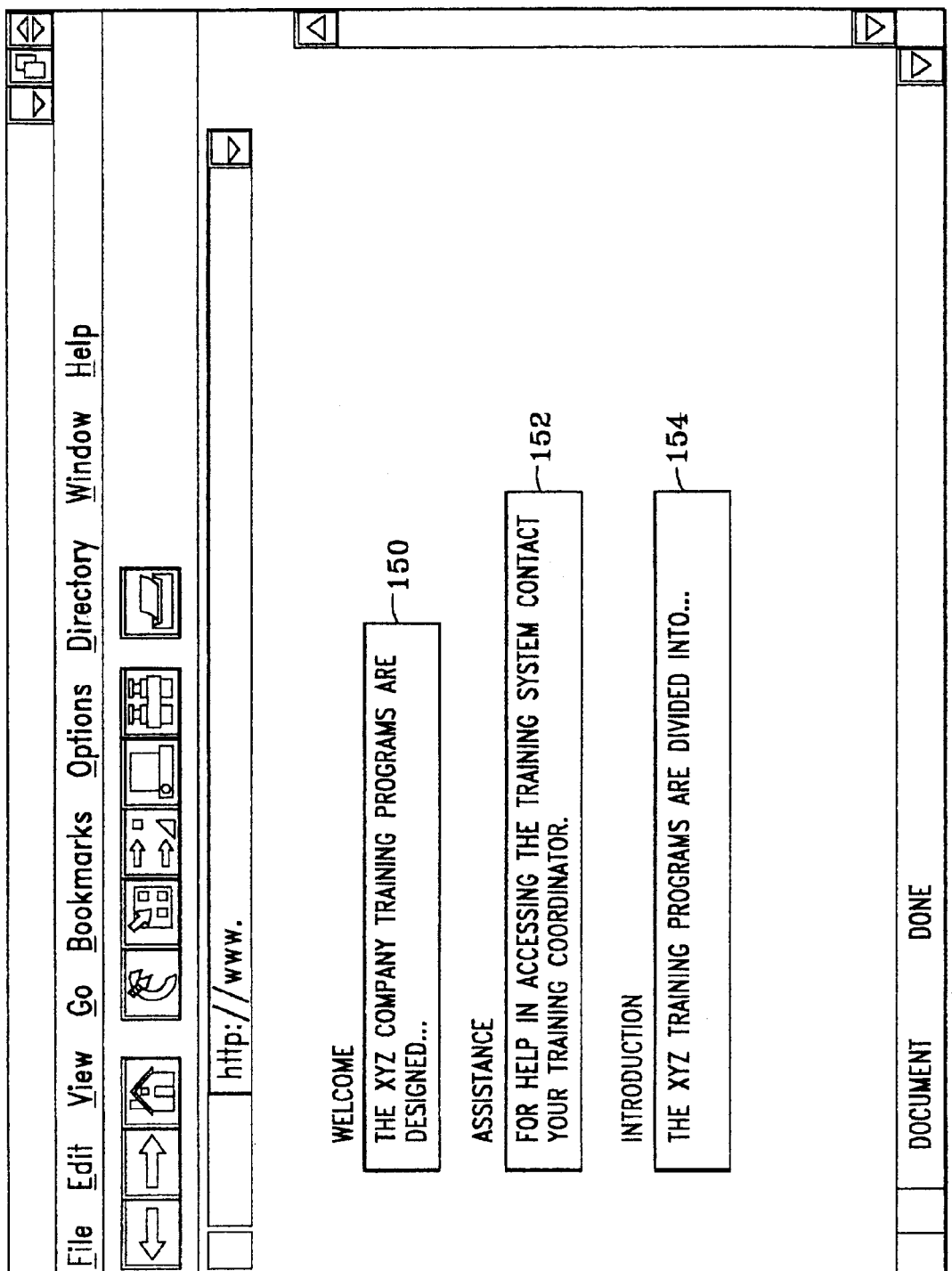
FIG. 8 is an exemplary user interface for editing a training program.

One task a system administrator can perform is to edit the introductory material provided to users logging into the training system 14. As shown in FIG. 8, the system administrator can alter introductory text to the training system such as a welcome message, and assistance message and introductory message. All these items are edited through dialog windows 150, 152 and 154 respectively which are part of the editable training program template. The system administrator can edit the text in dialog windows 150, 152 and 154 through text editing and thus no programming knowledge is required. The text entered in dialog windows 150, 152 and 154 is stored in database 70 and accessed by the training system 14 during execution of a training program. As described above, the content may extend beyond text and include images, sounds, video, etc.

Figure 9:
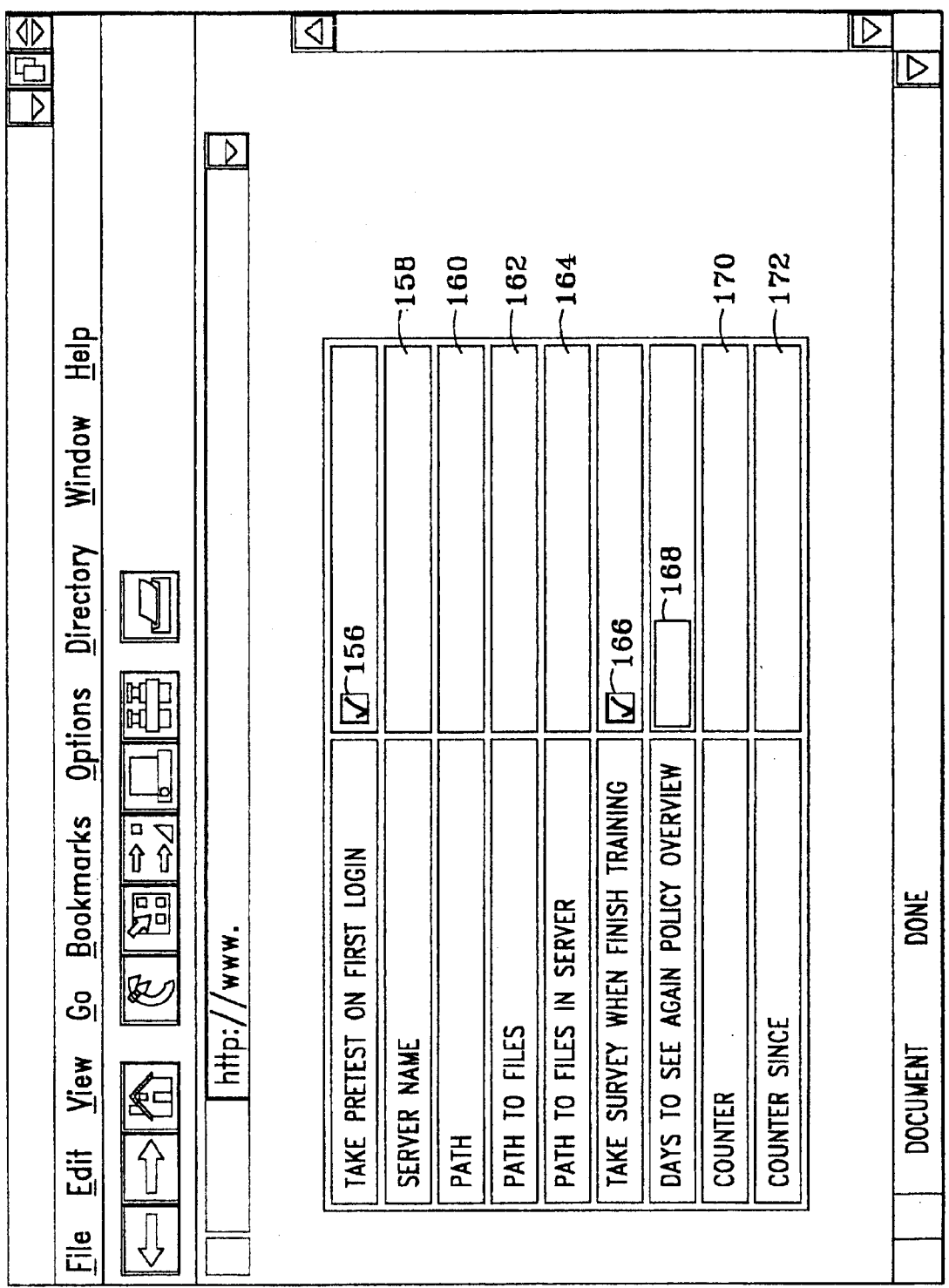
FIG. 9 is an exemplary user interface for specifying functional aspects of the system of FIG. 1.

In addition to editing content of the training programs, the system administrator can control functional aspects of the training system. Shown in FIG. 9 is system administrator screen through which a system administrator can specify function parameters of the training system 14. A pretest designator 156 may be selected to require new trainees to take a pretest prior to acquiring training in a policy. The pretest helps system administrators determine the effectiveness of the training program. After completing a training program, a user should have a higher of correct answers than in the pretest.

Windows 158, 160, 162 and 164 allow the system administrator to define the applications server 39, the path to the server, the path to files accessed by the server and the path to files stored in the server. As described above, the applications server may access training programs from database 70 of from memory in the applications server 39. The system administrator may also add files to the database 70 for access by the training system 14 during execution of a training program. These files may include items such as text files (text of American with Disabilities Act), graphic files (such gif files, tif files, etc.) and other types of files that are known in the art.

A survey designator 166 allows the system administrator to require that a survey be completed upon completing training in a sub-topic. If the survey designator is selected, the training system 14 will access the survey and present the survey to user system 18 upon completion of a training program. Reports can then be generated based on the surveys as described herein with reference to FIG. 10.

A policy overview time limit may be set in window 168. The policy overview time limit prescribes a time limit (e.g., a number of days) after which a user must review the policy overview provided in the training program. If the difference between the user's last access to the training program and the current access to the training program exceeds the policy overview time limit, then the user is required to review policy overview for that training program.

A counter field 170 and counter since field 172 indicate the number of times the training system 14 has been accessed for training (rather than for creating training materials) and the date when the count was initiated. The system administrator can reset the counter and date if desired.

Figure 10:
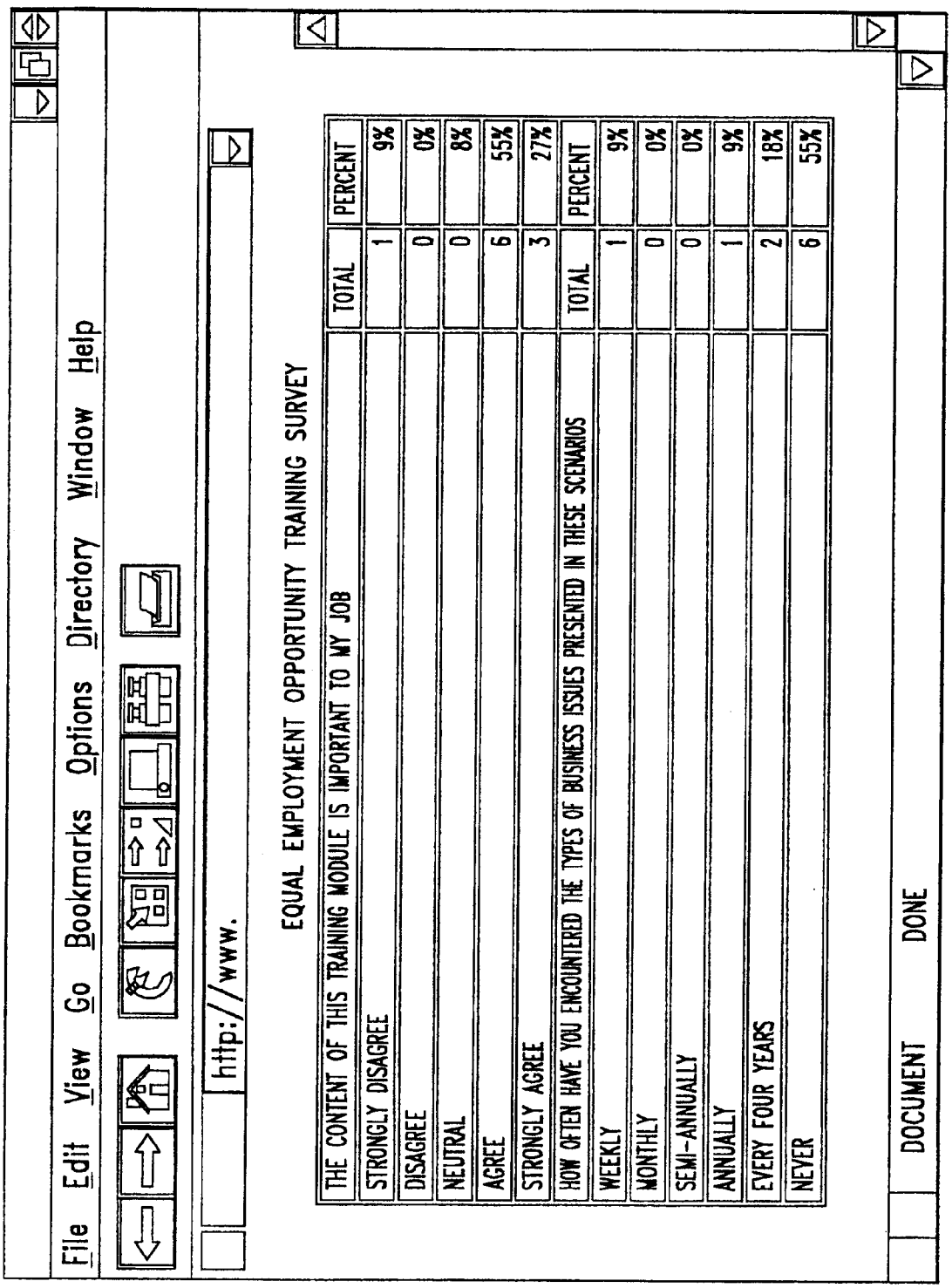
FIG. 10 depicts an exemplary training survey report generated by the system of FIG. 1.

A number of reports can be generated by the system administrator, one of which is a survey report as shown in FIG. 10. The survey report provides the results of the surveys presented upon completion of each sub-topic or upon completion of a policy (i.e., all sub-topics under a policy). As shown in FIG. 10, the survey report includes the number of responses for each answer in the survey and the percentage for each response. The system administrator can use the survey report to evaluate the effectiveness of training programs for sub-topics and the overall training program for a policy.

Another report produced by the training system 14 is a training statistical report such as that shown in FIG. 11. The training statistical report identifies, for each sub-topic, the number of individuals trained, the average time spent training, the number correct and percent correct in a pretest and the number correct and percent correct after completing the training program. The training system 14 acquires this data as a trainee is performing training and stores the statistical data in database 70 or in another memory accessible by the training system 14. The comparison of pretest and post test correct answers is useful in that the training program should increase the trainee's awareness of issues under the policy and lead to improvement in the number of correct answers after acquiring training. Lack of an increase in correct answer percentage from pretest to post test may indicate that the training program requires revision.

Figure 12:
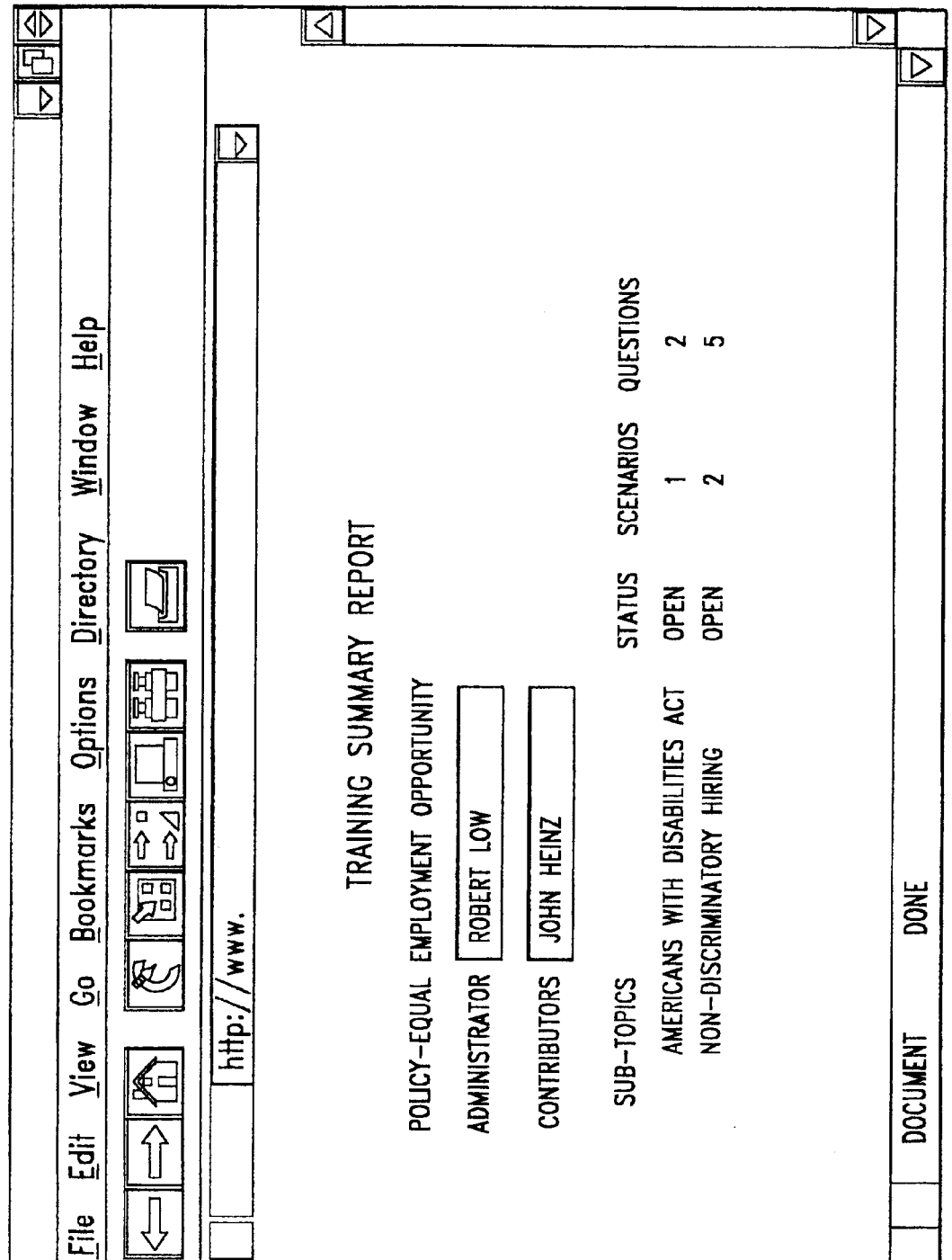
FIG. 12 depict s an exemplary training summary report generated by the system of FIG. 1.

A training summary report may also be generated by the training system upon request by a system administrator. An exemplary training summary report is shown in FIG. 12. The training summary report identifies the policy, the administrator for the training program directed to the policy and contributors to the training program. The training summary report also includes a list of sub-topics and a status for each sub-topic. The status indicates whether the training program for that sub-topic is available for access by users. The number of scenarios presented in the sub-topic and number of total questions is also provided for each sub-topic. This report provides the system administrator with a high level understanding of the extent and availability of training programs in the training system 14.

A number of other reports may be generated by the training system 14 for a system administrator. For example, the system administrator may request a report of all training completed by a specific user or all training completed by date. Alternatively, the names of users receiving training and dates of completion for each sub-topic may be provided in a report to the system administrator. The reports are generated by training system 14 accessing training data stored in database 70 and parsing and sorting the data in response to the system administrator's query.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method of providing training to a plurality of users in a system including a training system and a plurality of user systems coupled to the training system via a network, the method comprising:

receiving a request to create a training program at the training system;

receiving a user identity from the user system through a log in procedure;

identifying the user system as one of a trainee and an administrator based on the user identity;

if the user identity corresponds to the administrator, providing an editable training program template to the user system in response to the request to create a training program, said editable training program template permitting entry of content for the training program;

allowing the administrator to associate a contributor with the training program;

providing the contributor access to edit the training program; and, denying the contributor access to edit further training programs with which the contributor is not associated;

wherein said training program includes sub-topics, said contributor being granted access to edit a subset of the sub-topics within the training program.

2. The method of claim 1 further comprising:

allowing an administrator to require a trainee to take a pretest prior to providing said training program to said trainee.

3. The method of claim 1 further comprising:
allowing an administrator to require a trainee to complete a sub-topic survey upon completion of a sub-topic of said training program, said sub-topic corresponding to a portion of said training program.

4. The method of claim 1 further comprising:
providing an administrator with a report related to said training system.

5. The method of claim 4 wherein:
said report is a training statistical report including a number of correct answers and percent of correct answers for said training program.

6. The method of claim 4 wherein:
said report is a training summary report including a policy, sub-topics, number of questions and an administrator for said training program.

7. The method of claim 1 further comprising:
receiving a user's preferred language;
storing said user's preferred language; and
presenting training programs to the user in said preferred language.

8. The method of claim 1 further comprising associating an owner with the training program.

9. A system for providing training to a plurality of users, the system comprising:
a training system connected to a user system by a network, said training system providing an editable training program template to the user system in response to a request to create a training program, said editable training program template permitting entry of content for the training program;
wherein:
said training system identifies the user system as one of a trainee and an administrator;
said training system provides the administrator access to said editable training program template;
said training system associates a contributor with the training program;
said training system provides the contributor access to said editable training program template;
said training system denies the contributor access to edit further training programs with which the contributor is not associated;
said training program includes sub-topics, said training system granting the contributor access to edit a subset of the sub-topics within the training program.

10. The system of claim 9 wherein:
said training system requires a trainee to take a pretest prior to providing said training program to said trainee.

11. The system of claim 9 wherein:
said training system requires a trainee to complete a sub-topic survey upon completion of a sub-topic of said training program, said sub-topic corresponding to a portion of said training program.

12. The system of claim 9 wherein:
said training system provides an administrator with a report related to said training system.

13. The system of claim 12 wherein:
said report is a training statistical report including a number of correct answers and percent of correct answers for said training program.

14. The system of claim 12 wherein:
said report is a training summary report including a policy, sub-topics, number of questions and an administrator for said training program.

15. The system of claim 9 wherein:
said training system receives a user's preferred language;
said training system stores said user's preferred language; and
said training system presents training programs to the user system in said preferred language.

16. The system of claim 9 said user system associates an owner with the training program.

17. A storage medium encoded with machine-readable computer program code for providing training to a plurality of users in a system including a user system and a training system connected by a network, the storage medium including instructions for causing the training system to implement a method comprising:
receiving a request to create a training program at the training system;
receiving a user identity from the user system though a log in procedure;
identifying the user system as one of a trainee and an administrator based on the user identity;
if the user identity corresponds to the administrator, providing an editable training program template to the user system in response to the request to create a training program, said editable training program template permitting entry of content for the training program;
allowing the administrator to associate a contributor with the training program;
providing the contributor access to edit the training program;
denying the contributor access to edit further training programs with which the contributor is not associated;
wherein said training program includes sub-topics, the contributor being granted access to edit a subset of the sub-topics within the training program.

18. The storage medium of claim 17 further comprising instructions for causing the training system to implement:
allowing an administrator to require a trainee to take a pretest prior to providing said training program to said trainee.

19. The storage medium of claim 17 further comprising instructions for causing the training system to implement:
allowing an administrator to require a trainee to complete a sub-topic survey upon completion of a sub-topic of said training program, said sub-topic corresponding to a portion of said training program.

20. The storage medium of claim 17 further comprising instructions for causing the training system to implement:
providing an administrator with a report related to said training system.

21. The storage medium of claim 20 wherein:
said report is a training statistical report including a number of correct answers and percent of correct answers for said training program.

22. The storage medium of claim 20 wherein:
said report is a training summary report including a policy, sub-topics, number of questions and an administrator for said training program.

23. The storage medium of claim 17 further comprising instructions for causing the training system to implement:
receiving a user's preferred language;
storing said user's preferred language; and
presenting training programs to the user in said preferred language.

24. The storage medium of claim 17 further comprising instructions for causing the training system to implement:
allowing the administrator to associate an owner with the training program.

25. A method of providing training to a plurality of users in a system including a training system and a plurality of user systems coupled to the training system via a network, the method comprising:
receiving a request to create a training program at the training system;
receiving a user identity from the user system through a log in procedure;
identifying the user system as one of a trainee and an administrator based on the user identity;
if the user identity corresponds to the administrator, providing an editable training program template to the user system in response to the request to create a training program, said editable training program template permitting entry of content for the training program;
allowing the administrator to associate a contributor with the training program;
providing the contributor access to edit the training program;
denying the contributor access to edit further training programs with which the contributor is not associated; and,
allowing an administrator to require a trainee to complete a sub-topic survey upon completion of a sub-topic of said training program, said sub-topic corresponding to a portion of said training program;
wherein said training program includes a plurality of sub-topics, said training system generating a survey report providing results for a plurality of sub-topic surveys each corresponding to one of said plurality of sub-topics.

26. A system for providing training to a plurality of users, the system comprising:
a training system connected to a user system by a network, said training system providing an editable training program template to the user system in response to a request to create a training program, said editable training program template permitting entry of content for the training program;
wherein:
said training system identifies the user system as one of a trainee and an administrator;
said training system provides the administrator access to said editable training program template;
said training system associates a contributor with the training program;
said training system provides the contributor access to said editable training program template;
said training system denies the contributor access to edit further training programs with which the contributor is not associated,
said training system allows an administrator to require a trainee to complete a sub-topic survey upon completion of a sub-topic of said training program, said sub-topic corresponding to a portion of said training program;
wherein said training program includes a plurality of sub-topics, the method further comprising generating a survey report providing results for a plurality of sub-topic surveys each corresponding to one of said plurality of sub-topics.

27. A storage medium encoded with machine-readable computer program code for providing training to a plurality of users in a system including a user system and a training system connected by a network, the storage medium including instructions for causing the training system to implement a method comprising:
receiving a request to create a training program at the training system;
receiving a user identity from the user system though a log in procedure;
identifying the user system as one of a trainee and an administrator based on the user identity;
if the user identity corresponds to the administrator, providing an editable training program template to the user system in response to the request to create a training program, said editable training program template permitting entry of content for the training program;
allowing the administrator to associate a contributor with the training program;
providing the contributor access to edit the training program;
denying the contributor access to edit further training programs with which the contributor is not associated;
allowing an administrator to require a trainee to complete a sub-topic survey upon completion of a sub-topic of said training program, said sub-topic corresponding to a portion of said training program;
wherein said training program includes a plurality of sub-topics, the storage medium further comprising instructions for causing the training system to generate a survey report providing results for a plurality of sub-topic surveys each corresponding to one of said plurality of sub-topics.

28. A method of providing training to a plurality of users in a system including a training system and a plurality of user systems coupled to the training system via a network, the method comprising:
receiving a request to create a training program at the training system;
receiving a user identity from the user system through a log in procedure;
identifying the user system as one of a trainee and an administrator based on the user identity;
if the user identity corresponds to the administrator, providing an editable training program template to the user system in response to the request to create a training program, said editable training program template permitting entry of content for the training program;
allowing the administrator to associate a contributor with the training program;
providing the contributor access to edit the training program;
denying the contributor access to edit further training programs with which the contributor is not associated;
providing an administrator with a report related to said training system;
wherein said report is a training statistical report including a number of correct answers and percent of correct answers for said training program;
wherein said number of correct answers and percent of correct answers are presented for a pretest completed by the trainee.

29. A system for providing training to a plurality of users, the system comprising:

a training system connected to a user system by a network, said training system providing an editable training program template to the user system in response to a request to create a training program, said editable training program template permitting entry of content for the training program;

wherein:

said training system identifies the user system as one of a trainee and an administrator;

said training system provides the administrator access to said editable training program template;

said training system associates a contributor with the training program;

said training system provides the contributor access to said editable training program template;

said training system denies the contributor access to edit further training programs with which the contributor is not associated;

wherein said training system provides an administrator with a report related to said training system;

wherein said report is a training statistical report including a number of correct answers and percent of correct answers for said training program;

wherein said number of correct answers and percent of correct answers are presented for a pretest completed by the trainee.

30. A storage medium encoded with machine-readable computer program code for providing training to a plurality of users in a system including a user system and a training system connected by a network, the storage medium including instructions for causing the training system to implement a method comprising:

receiving a request for training at the training system;

providing a training program to the user system in response to the request for training;

receiving a request to create a training program at the training system;

receiving a user identity from the user system though a log in procedure;

identifying the user system as one of a trainee and an administrator based on the user identity;

if the user identity corresponds to the administrator, providing an editable training program template to the user system in response to the request to create a training program, said editable training program template permitting entry of content for the training program;

allowing the administrator to associate a contributor with the training program;

providing the contributor access to edit the training program;

denying the contributor access to edit further training programs with which the contributor is not associated;

providing an administrator with a report related to said training system;

wherein said report is a training statistical report including a number of correct answers and percent of correct answers for said training program;

wherein said number of correct answers and percent of correct answers are presented for a pretest completed by the trainee.

\* \* \* \* \*

UNITED STATES PATENT AND TRADEMARK OFFICE
CERTIFICATE OF CORRECTION

PATENT NO. : 6,519,445 B2
DATED : February 11, 2003
INVENTOR(S) : Evangeline H. Casey-Cholakis et al.

It is certified that error appears in the above-identified patent and that said Letters Patent is hereby corrected as shown below:

Title page,
Item [73], Assignee, after "Company" delete "Pittsfield, MA" and insert
-- Schenectady, NY --,
Item [56], References Cited, U.S. PATENT DOCUMENTS,
"5,823,781" reference, delete "Hitchock" and insert -- Hitchcock --.

Column 2,
Line 9, after "12" delete "depict s" and insert -- depicts --.

Column 3,
Line 27, after "identity" delete "though" and insert -- through --.

Column 6,
Line 30, after "message," delete "and" and insert -- an --.
Line 43, after "9 is" insert -- the --.
Line 50, after "higher" insert -- percentage --.
Line 57, after "70" delete "of" and insert -- or --.

Column 10,
Line 7, after "9" insert -- wherein: --.

Column 14,
Line 6, after "system" delete "though" and insert -- through --.

Signed and Sealed this

Seventh Day of February, 2006

JON W. DUDAS
*Director of the United States Patent and Trademark Office*